(12) United States Patent
Kim et al.

(10) Patent No.: US 9,355,967 B2
(45) Date of Patent: May 31, 2016

(54) STRESS COMPENSATION PATTERNING

(71) Applicant: QUALCOMM Incorporated, San Diego, CA (US)

(72) Inventors: Daeik D. Kim, San Diego, CA (US); Je-Hsiung Lan, San Diego, CA (US); Mario Francisco Velez, San Diego, CA (US); Chengjie Zuo, Santee, CA (US); Jonghae Kim, San Diego, CA (US); Changhan Yun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 26 days.

(21) Appl. No.: 13/946,135

(22) Filed: Jul. 19, 2013

(65) Prior Publication Data
US 2014/0374914 A1    Dec. 25, 2014

Related U.S. Application Data

(60) Provisional application No. 61/838,451, filed on Jun. 24, 2013, provisional application No. 61/840,700, filed on Jun. 28, 2013, provisional application No. 61/842,315, filed on Jul. 2, 2013.

(51) Int. Cl.
*H01L 23/48* (2006.01)
*H01L 23/52* (2006.01)
*H01L 29/40* (2006.01)
*H01L 23/00* (2006.01)
*H01L 21/02* (2006.01)
*G06F 17/50* (2006.01)

(52) U.S. Cl.
CPC .......... *H01L 23/562* (2013.01); *G06F 17/5081* (2013.01); *H01L 21/02005* (2013.01); *G06F 2217/80* (2013.01); *H01L 2924/0002* (2013.01); *H01L 2924/3511* (2013.01)

(58) Field of Classification Search
USPC .................................................. 257/622, 773
See application file for complete search history.

(56) References Cited

U.S. PATENT DOCUMENTS

| | | | |
|---|---|---|---|
| 7,649,749 B2 | 1/2010 | Tsukano et al. | |
| 7,816,666 B2 * | 10/2010 | Koo et al. | 257/40 |
| 8,014,154 B2 | 9/2011 | Lee | |
| 2003/0216009 A1 | 11/2003 | Matsuura et al. | |
| 2004/0245642 A1 | 12/2004 | Hasunuma et al. | |
| 2005/0127512 A1 | 6/2005 | Yamagata | |
| 2006/0108653 A1 * | 5/2006 | Koo et al. | 257/420 |

(Continued)

FOREIGN PATENT DOCUMENTS

| | | |
|---|---|---|
| DE | 102007048007 A1 | 4/2008 |
| JP | H02181425 A | 7/1990 |

(Continued)

OTHER PUBLICATIONS

International Search Report and Written Opinion—PCT/US2014/041656—ISA/EPO—Nov. 28, 2014.

(Continued)

*Primary Examiner* — Telly Green
(74) *Attorney, Agent, or Firm* — Toler Law Group

(57) ABSTRACT

An apparatus includes a device that includes at least one layer. The at least one layer includes an inter-device stress compensation pattern configured to reduce an amount of inter-device warpage prior to the device being detached from another device.

31 Claims, 11 Drawing Sheets

(56) References Cited

U.S. PATENT DOCUMENTS

| | | |
|---|---|---|
| 2009/0126982 A1 | 5/2009 | Nakamura et al. |
| 2010/0120202 A1 | 5/2010 | Wu et al. |
| 2010/0252919 A1 | 10/2010 | Xu et al. |
| 2010/0264423 A1 | 10/2010 | Wood et al. |
| 2010/0283131 A1 | 11/2010 | Chandrasekaran |
| 2011/0049723 A1 | 3/2011 | Fayaz et al. |
| 2011/0140118 A1 | 6/2011 | Ramdani |
| 2011/0147895 A1 | 6/2011 | Bai et al. |
| 2012/0244664 A1 | 9/2012 | Jin et al. |
| 2013/0037922 A1 | 2/2013 | Arriagada et al. |
| 2013/0334711 A1* | 12/2013 | Blackshear ........... H01L 23/145 257/778 |

FOREIGN PATENT DOCUMENTS

| | | |
|---|---|---|
| JP | H1022236 A | 1/1998 |
| JP | 2000151035 A | 5/2000 |
| JP | 2002076530 A | 3/2002 |
| JP | 2008083579 A | 4/2008 |
| JP | 2008151849 A | 7/2008 |

OTHER PUBLICATIONS

Partial International Search Report—PCT/US2014/041656—ISA/EPO—Oct. 2, 2014.

* cited by examiner

STRESS COMPENSATION PATTERNING

I. CLAIM OF PRIORITY

The present application claims priority from U.S. Provisional Patent Application No. 61/838,451, entitled "STRESS COMPENSATION PATTERNING," filed Jun. 24, 2013, U.S. Provisional Patent Application No. 61/840,700, entitled "STRESS COMPENSATION PATTERNING," filed Jun. 28, 2013, and U.S. Provisional Patent Application No. 61/842,315, entitled "STRESS COMPENSATION PATTERNING," filed Jul. 2, 2013, the contents of each of which are incorporated by reference in their entirety.

II. FIELD

The present disclosure is generally related to device fabrication.

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, may communicate voice and data packets over wireless networks. Further, many such wireless telephones include other types of devices that are incorporated therein. For example, a wireless telephone may also include a digital still camera, a digital video camera, a digital recorder, and an audio file player. Also, such wireless telephones may process executable instructions, including software applications, such as a web browser application, that may be used to access the Internet. As such, these wireless telephones may include significant computing capabilities.

A substrate (e.g., a silicon substrate or a glass substrate) may be a foundation upon which a device (e.g. an integrated passive device) used in electronic devices may be fabricated. A glass substrate may be less expensive than a silicon substrate and in applications involving radio frequency signals, a glass substrate may cause reduced signal attenuation as compared to a silicon substrate. Integrated passive devices having glass substrates may include thick metallization layers to achieve low-loss and high-quality. The thick metallization layers may add stress to the integrated passive device, causing the integrated passive device to warp (e.g., deform, bend, twist, etc.). Warpage associated with integrated passive devices used in an electronic device (e.g., a wireless device or a computing device) may reduce the radio frequency performance of the electronic device. Warpage may also reduce processing efficiency and testability of the integrated passive devices. Although warpage may be reduced by using smaller metallization layers, smaller metallization layers may limit radio frequency performance.

IV. SUMMARY

Stress compensation patterning is introduced to reduce warpage of a wafer. The patterns may be implemented in different layers of a device to reduce warpage of the device. For example, the patterns may be device-level patterns configured to reduce warpage of the device and wafer-level patterns to reduce warpage of the wafer from which the device is generated. The wafer may include multiple dies and the patterns may be position-dependent patterns that are a function of a distance from a center of the wafer. For example, wafer-level patterns may provide more stress compensation to dies located close to an edge of the wafer than to dies located close to the center of the wafer. The techniques described herein may enable use of relatively thick metallization layers (e.g., approximately 10 micrometers) for devices.

In a particular embodiment, an apparatus includes a device that includes at least one layer. The at least one layer includes an inter-device stress compensation pattern configured to reduce an amount of inter-device warpage prior to the device being detached from another device.

In another particular embodiment, a method includes forming an inter-device stress compensation pattern in at least one layer of a device to reduce an amount of inter-device warpage prior to the device being detached from another device.

In another particular embodiment, a computer-readable storage medium includes instructions that, when executed by a processor, cause the processor to initiate forming of an inter-device stress compensation pattern in at least one layer of a device to reduce an amount of inter-device warpage prior to the device being detached from another device.

In another particular embodiment, an apparatus includes means for relieving stress in at least one layer of a device according to an inter-device pattern to reduce an amount of warpage of the device. The apparatus also includes means for relieving stress in the device according to an intra-device pattern.

In another particular embodiment, an apparatus includes a device that includes at least one layer. The at least one layer includes a stress compensation pattern configured to reduce an amount of warpage of the device. The stress compensation pattern includes one or more voids in the at least one layer.

In another particular embodiment, an apparatus includes a device that includes at least one layer. The at least one layer includes a stress compensation pattern configured to reduce an amount of warpage of the device. The stress compensation pattern includes a pattern of scribing lines that are scribed into the at least one layer.

In another particular embodiment, an apparatus includes a panel having a stress compensation pattern configured to reduce an amount of warpage associated with the panel.

One particular advantage provided by at least one of the disclosed embodiments is that an amount of warpage in a device that is caused by thick metallization layers may be reduced as compared to devices that do not incorporate stress compensation patterns. For example, the stress compensation patterns may selectively reduce an amount of stress (applied to a device and a wafer from which the device is generated) by providing added support to particular areas of the device (and the wafer) that would otherwise be prone to disfigurement (e.g., warpage). Reducing the amount of stress, and thus reducing the amount of warpage, may improve processing efficiency and improve the testability of the device. Reducing the amount of stress may also improve the radio frequency performance of an electronic device that includes the device.

Other aspects, advantages, and features of the present disclosure will become apparent after review of the entire application, including the following sections: Brief Description of the Drawings. Detailed Description, and the Claims.

V. BRIEF DESCRIPTION OF THE DRAWINGS

VI. DETAILED DESCRIPTION

Particular embodiments of devices that include position dependent patterns and methods of fabricating devices are presented in this disclosure. It should be appreciated, however, that the concepts and insights used in the particular embodiments may be embodied in a variety of contexts. The particular embodiments presented are merely illustrative, and do not limit the scope of this disclosure.

The present disclosure describes the particular embodiments in specific contexts. However, features, methods, structures or characteristics described according to the particular embodiments may also be combined in suitable manners to form one or more other embodiments. In addition, figures are used to illustrate the relative relationships between the features, methods, structures, or characteristics, and thus may not be drawn in scale. Directional terminology, such as "top," "bottom," "front," "back," etc. is used with reference to the orientation of the figures being described. As such, the directional terminology is used for purposes of illustration and is not meant to be limiting.

Figure 1:
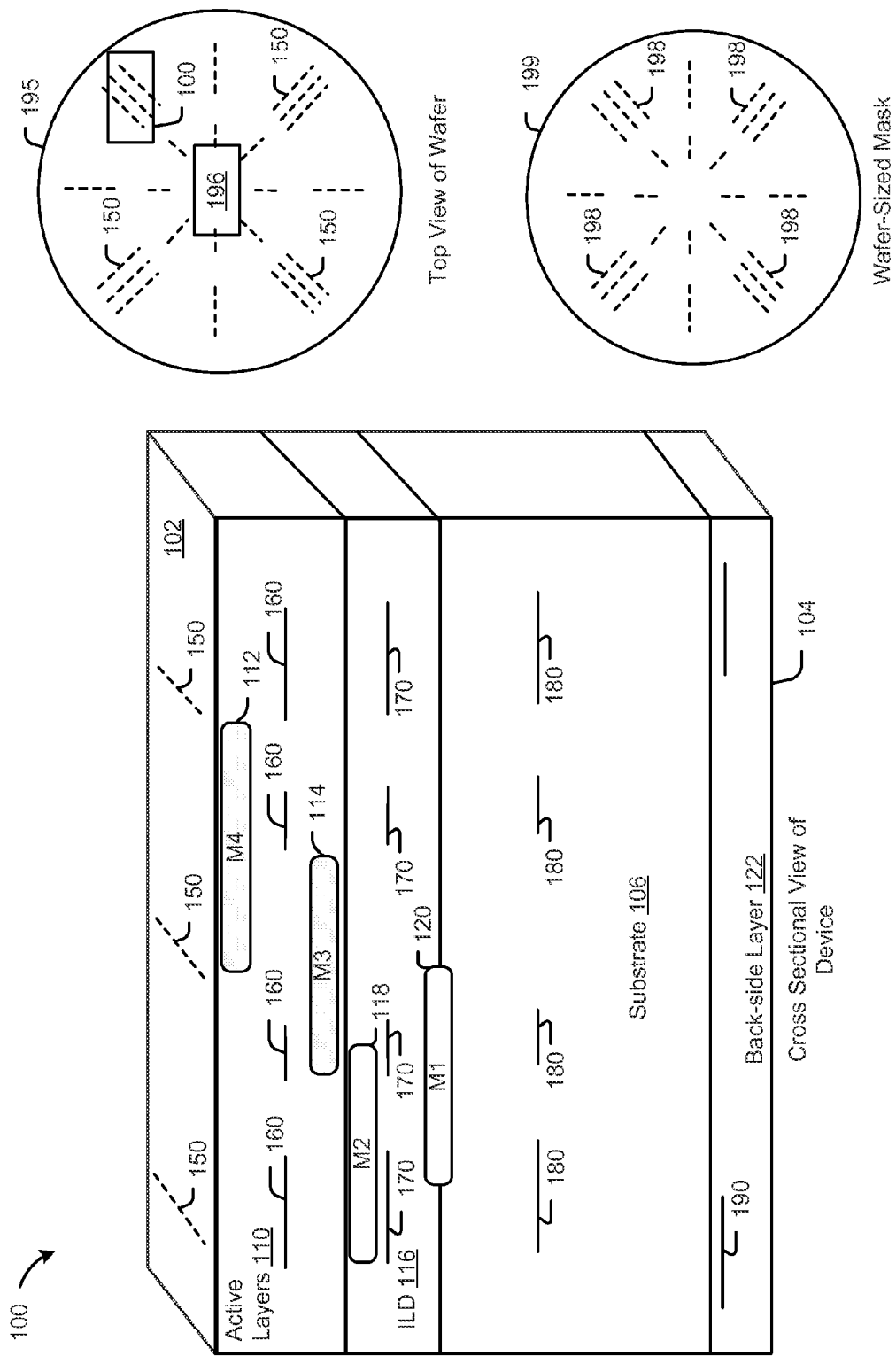
FIG. 1 is a diagram of a particular illustrative embodiment of a device that includes stress compensation patterns to reduce stress.

Referring to FIG. 1, a particular illustrative embodiment of a device 100 that includes stress compensation patterns is shown. FIG. 1 shows a cross sectional, partial perspective view of the device 100. FIG. 1 also shows a top view of a wafer 195 from which the device 100 is generated and a wafer-sized mask 199. For example, in a particular embodiment, the wafer 195 may correspond to another device from which the device 100 may be detached.

The device 100 is illustrated as having a top surface 102 and a bottom surface 104. The device 100 also includes a substrate 106. The substrate 106 may be made of a low-loss material (e.g., dielectric, wide-bandgap semiconductor, etc.). The low-loss material may include a dielectric material or a highly-insulative semiconductor material. In a particular embodiment, the device 100 is an integrated passive device and the substrate 106 includes a glass-type substrate. In another particular embodiment, the substrate 106 includes a silicon-type substrate. In yet another particular embodiment, the substrate 106 may include a silicon-on-insulator (SOI) substrate, a silicon-on-sapphire (SOS) substrate, a high resistivity substrate (HRS), or a silicon carbide (SiC) substrate, as illustrative, non-limiting examples.

The device 100 includes a front-side and a back-side. The front-side of the device 100 may include active layers 110 and an inter-layer dielectric (ILD) 116. The active layers 110 may include one or more metal features, such as metallization layers 112, 114. In a particular embodiment, inputs and outputs (I/Os) of the device 100 may be formed in the at least one of the metallization layers 112, 114. The metallization layers 112, 114 may have a thickness of up to ten micrometers. The device 100 may include an inter-device stress compensation pattern 150 (e.g., a wafer-level stress compensation pattern) to reduce stress and inter-device warpage prior to the device 100 being detached from another device (e.g., the wafer 195). For example, the inter-device stress compensation pattern 150 may reduce an amount of inter-device (and intra-device) warpage caused by the metallization layers 112, 114. The inter-device stress compensation pattern 150 may be an inter-die position-dependent pattern that is a function of at least a distance from the center of the wafer 195. In a particular embodiment, the inter-device stress compensation pattern 150 may be dependent on an angle associated with the position of the device 100 on the wafer 195 (e.g., in a polar coordinate system).

The active layers 110 may include a stress compensation pattern 160. In a particular embodiment, the stress compensation pattern 160 may be an intra-device pattern (e.g., an intra-die pattern). In another particular embodiment, the stress compensation pattern 160 may correspond to the inter-device stress compensation pattern 150 (e.g., an inter-die pattern). The stress compensation pattern 160 in the active layers 110 may reduce an amount of warpage of the device 100 caused by the metallization layers 112, 114. For example, the stress compensation pattern 160 may compensate for stress that may result from the thickness of the metallization layers (e.g., the metallization layers 112, 114) in the device 100. In a particular embodiment, the stress compensation pattern 160 includes a pattern of etches in the active layers 110 that are implemented during fabrication of the device 100. In another particular embodiment, the stress compensation pattern 160 includes a pattern of metal deposited in the active layers 110 during fabrication of the device 100. For example, the metal may include at least one of copper (Cu), tungsten (W), silver (Ag), or gold (Au). In another particular embodiment, the stress compensation pattern 160 may include scribing lines (e.g., holes) that are scribed into the device 100 via a laser scribing tool after the device has been fabricated. As explained with respect to FIG. 5, the laser scribing tool may use dicing streets to identify areas (e.g., non-active areas) to scribe the scribing lines.

The ILD 116 may include one or more metal features, such as metallization layers 118, 120. The ILD 116 may include also include a stress compensation pattern 170. In a particular embodiment, the stress compensation pattern 170 may be an intra-device pattern (e.g., an intra-die pattern). In another particular embodiment, the stress compensation pattern 170 may correspond to the inter-device stress compensation pattern 150 (e.g., an inter-die pattern). The stress compensation pattern 170 in the ILD 116 may operate in a substantially similar manner as the stress compensation pattern 160 in the active layers 110. For example, the stress compensation pattern 170 in the ILD 116 may reduce an amount of warpage of the device 100. The warpage may be caused by the metallization layers 118, 120 in the ILD 116, the metallization layers 112, 114 in the active layers 110, or any combination thereof.

In a particular embodiment, the stress compensation pattern 170 may include a pattern of etches in the ILD 116 that are implemented during fabrication of the device 100. In another particular embodiment, the stress compensation pattern 170 may include a pattern of metal deposited in the ILD 116 during fabrication of the device 100. The metallization layers 118, 120 may also include a stress compensation pattern (not shown). The stress compensation pattern on the metallization layers 118, 120 may be non-functional with respect to operation of the device 100 and may instead be included to reduce an amount of warpage of the device 100.

The substrate 106 may include a stress compensation pattern 180. In a particular embodiment, the stress compensation pattern 180 may be an intra-device pattern. In another particular embodiment, the stress compensation pattern 180 may correspond to the inter-device stress compensation pattern 150 (e.g., an inter-die pattern). The stress compensation pattern 180 in the substrate 106 may operate in a substantially similar manner as the stress compensation pattern 170 in the first ILD 116. For example, the stress compensation pattern 180 in the substrate 106 may reduce an amount of warpage of the device 100 caused by metallization layers 112, 114, 118, 120. In a particular embodiment, the stress compensation pattern 180 may include a pattern of etches in the substrate 106 that are implemented during fabrication of the device 100. In another particular embodiment, the stress compensation pattern 180 may include a pattern of metal deposited in the substrate 106 during fabrication of the device 100.

The device 100 may include a back-side layer 122. The back-side layer 122 may include a stress compensation pattern 190 (e.g., a back-side stress compensation pattern). In a particular embodiment, the stress compensation pattern 190 may be an intra-device pattern. In another particular embodiment, the stress compensation pattern 190 may correspond to the inter-device stress compensation pattern 150 (e.g. an inter-die pattern). In a particular embodiment, the stress compensation pattern 190 in the back-side layer 122 may be similar to stress compensation patterns at the front-side of the device 100. In a particular embodiment, the stress compensation pattern 190 in the back-side layer 122 may have a different pattern than one or more stress compensation patterns at the front-side of the device 100, as explained with respect to FIG. 2. For example, the metallization layers 112, 114, 118, 120 may cause a different amount of warpage at the back-side of the device 100 as compared to the front-side of the device 100. Alternatively, the metallization layers 112, 114, 118, 120 may cause differing warpage at different radial locations of the wafer 195. The stress compensation pattern 190 at the back-side of the device 100 may be selectively patterned to reduce an amount of warpage at the back-side of the device 100. The stress compensation pattern 190 may be configured to compensate for stress caused by at least one of the stress compensation patterns at the front-side of the device 100 (e.g., the stress compensation pattern 160 in the active layers 110 and/or the stress compensation pattern 170 in the ILD 116).

In a particular embodiment, the stress compensation pattern 190 may include a pattern of etches in the back-side layer 122 that are implemented during fabrication of the device 100. In another particular embodiment, the stress compensation pattern 190 may include a pattern of metal deposited in the back-side layer 122 during fabrication of the device 100. In yet another particular embodiment, the stress compensation pattern 190 may include scribing lines that are scribed into the device 100 via a laser scribing tool after the device 100 has been fabricated. Back-side stress compensation patterns may be configured to compensate for stress caused by stress compensation patterns 150-170 at the front-side of the device 100.

In a particular embodiment, stress compensation patterns located at the back-side of the device 100 may be vertical stress compensation patterns to compensate for vertical stress (i.e., stress in the direction from the top surface 102 to the bottom surface 104) or horizontal stress compensation patterns to compensate for horizontal stress (i.e., stress in the direction along the top surface 102 and/or along the bottom surface 104). In another particular embodiment, stress compensation patterns located at the front-side of the device 100 may be vertical stress compensation patterns to compensate for vertical stress or horizontal stress compensation patterns to compensate for horizontal stress.

The wafer 195 from which the device 100 is generated may include the inter-device stress compensation pattern 150. The inter-device stress compensation pattern 150 may be configured to reduce an amount of inter-device warpage (e.g., wafer warpage) prior to the device 100 being detached from the wafer 195. The inter-device stress compensation pattern 150 may be formed using the mask 199. Although the mask 199 is described as "wafer-sized," the mask 199 may not be the same size as the wafer 195 and may be larger or smaller than the wafer 195, while enabling the inter-device stress compensation pattern 150 to be formed at multiple dies of the wafer 195 without repositioning the mask 199. The mask 199 may include a pattern 198 (e.g., corresponding to the inter-device stress compensation pattern 150) used to etch, deposit metal, and/or scribe scribing lines into the device 100 based on a location of the device 100 on the wafer 195. In a particular embodiment, the inter-device stress compensation pattern 150 may correspond to at least one of the stress compensation patterns 160-190 within each layer of the device 100. For example, the stress compensation patterns 160-190 within each layer may correspond to etches, metal deposits, and/or scribed lines that are patterned within each respective layer throughout the wafer 195 to reduce warpage of the wafer 195.

The wafer 195 may include at least two dies. For example, the wafer 195 may include the device 100 (a first die) located close to the edge of the wafer 195 and a second die 196 located closer to the center of the wafer 195. The inter-device stress compensation pattern 150 may be a position dependent pattern that is a function of a distance from the center of the wafer 195, an angle associated with the center of the wafer 195, or any combination thereof. For example, the inter-device stress compensation pattern 150 may provide more stress compensation to the device 100 located closer to the edge of the wafer than to the second die 196 located closer to the center of the wafer 195. In a particular embodiment, dies located near an edge of the wafer 195 may include more stress compensation than dies located near the center of the wafer 195. As an illustrative example, the length of each particular element (etch, scribing line, and/or metallic deposit) in the wafer-level stress compensation pattern may be a function of a distance from the center of the wafer 195 (e.g. position-dependent).

In a particular embodiment, the device 100 and the second die 196 may include different stress compensation patterns (e.g., intra-device stress compensation patterns). For example, the device 100 may include the inter-device stress compensation pattern 150, and the second die 196 may include the inter-device stress compensation pattern 150 and an intra-device stress compensation pattern. Alternatively, or in addition, the device 100 and the second die 196 may include a common stress compensation pattern (e.g., inter-die stress compensation patterns). In a particular embodiment, the device 100 may include an inter-die stress compensation pattern and the second die 196 may include an intra-die stress compensation pattern. In another particular embodiment, the device 100 may include an intra-die stress compensation pattern and the second die 196 may include an inter-die stress compensation pattern.

By forming stress compensation patterns 160-190 at different layers in the device 100, an amount of warpage caused by the metallization layers 112, 114, 118, 120 may be reduced. For example, as the thickness of the metallization layers 112, 114, 118, 120 increases (or as more metallization layers 112, 114, 118, 120 are formed in the device 100), the amount of stress added to particular areas of the device 100 may increase. As a result, an amount of stress (and warpage) of the wafer 195 may increase, reducing the efficiency of wafer-level processing. The increase in stress may be caused by a first thermal expansion of at least one metallization layer 112, 114, 118, 120 that is different from a second thermal expansion of the substrate 106. The stress compensation patterns 160-190 may compensate for the added amount of stress by providing support to the device 100.

The stress compensation patterns 160-190 may be added as preventive measures during fabrication of the device 100 by selectively etching or selectively depositing metal in particular layers according to the inter-device stress compensation pattern 150 of the wafer 195. The stress compensation patterns 160, 170, 190 may also be implemented as post-fabrication stress relief measures by selectively scribing lines (e.g., holes) into the wafer 195. Reducing the amount of stress, and thus reducing an amount of warpage, may improve processing efficiency and improve the testability of the device 100 and the wafer 195. Reducing the amount of stress may also improve the radio frequency performance of an electronic device that includes the device 100.

It is noted that in some embodiments, film deposition processes, such as chemical vapor deposition (CVD), physical vapor deposition (PVD) (e.g., sputtering or evaporation), and/or electroplating may be used to form metal layers and inter-metal dielectric layers. Photolithography may be used to form patterns of metal layers. An etching process may be performed to remove unwanted materials. Planarization processes such as "etch-back" and chemical-mechanical polishing (CMP) may be employed to create a flat surface.

It is also noted that while the device 100 includes multiple layers 110, 116, 106, 122 and stress compensation patterns 160-180 for each layer, respectively, other embodiments may include additional (or fewer) layers and/or stress patterns. For example, in a particular embodiment, one or more layers may include stress compensation patterns while one or more other layers do not. Selection of which layers include stress compensation patterns may be determined via computer executable instructions that are executed by a machine (e.g., a processor) during or after fabrication, as described further with reference to FIG. 11.

Figure 2:
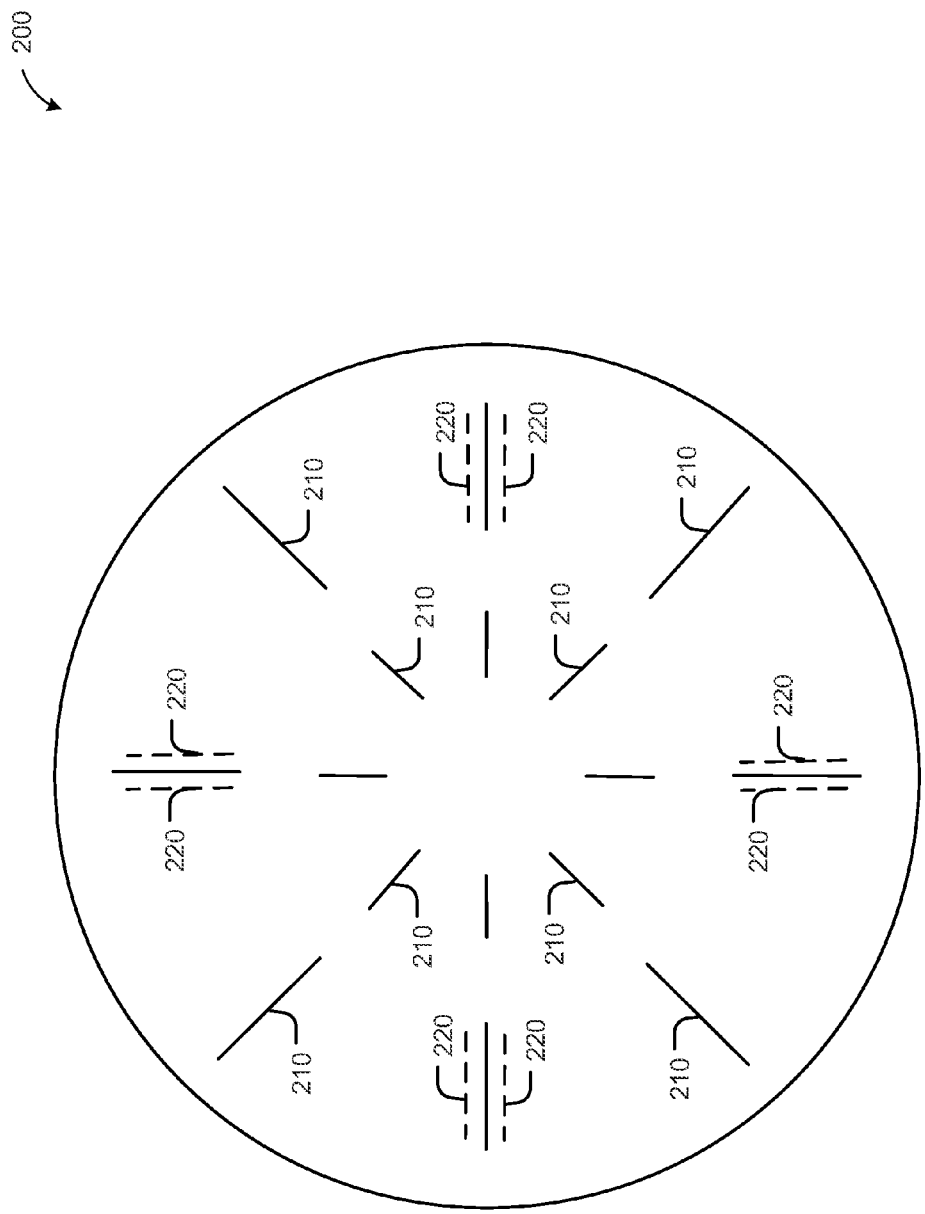
FIG. 2 is a diagram of a particular illustrative embodiment of a front-side stress compensation pattern and a back-side stress compensation pattern.

Referring to FIG. 2, a particular illustrative embodiment 200 of a front-side stress compensation pattern and a back-side stress compensation pattern is shown. A front-side stress compensation pattern 210 is illustrated as solid lines and a back-side stress compensation pattern 220 is illustrated as dotted lines. The front side stress compensation pattern 210 and the back-side stress compensation pattern 220 may be inter-device stress compensation patterns (e.g., wafer-level stress compensation patterns).

In a particular embodiment, the front-side stress compensation pattern 210 may correspond to the stress compensation pattern 160 in the active layers 110 of FIG. 1, the stress pattern 170 in the ILD 116 of FIG. 1, or any combination thereof. The back-side stress compensation pattern 220 may correspond to the stress compensation pattern 190 in the back-side layer 122 of FIG. 1.

The front-side stress compensation pattern 210 and the back-side stress compensation pattern 220 may be designed together to reduce stress (and warpage) of an integrated passive device (e.g., the device 100 of FIG. 1) and/or to reduce stress and inter-device warpage of another device from which the integrated passive device is generated (e.g. the wafer 195 of FIG. 1). For example, the front-side stress compensation pattern and the back-side stress compensation pattern 220 may reduce an amount of inter-device warpage prior to the device 100 being detached from the wafer 195. Computer-executable instructions that are executable by a machine (e.g., a processor) may analyze a layout of the wafer. The instructions may further be executable by a machine to determine and/or predict areas of the wafer that are subject to stress based on the layout of the wafer. Stress compensation patterns (e.g., the front-side stress compensation pattern 210 and the back-side stress compensation pattern 220) may reduce an amount of stress in the predicted areas.

Fabrication equipment may selectively etch the front-side stress compensation pattern 210 into one or more front-side layers of the integrated passive device and may selectively etch the back-side stress compensation pattern 220 into one or more back-side layers of the integrated passive device. Additionally, or in the alternative, fabrication equipment may selectively form the front-side stress compensation pattern 210 into one or more front-side layers of the integrated passive device by depositing metal into the one or more front-side layers. The fabrication equipment may also selectively form the back-side stress compensation pattern 220 into one or more back-side layers of the integrated passive device by depositing metal into the one or more back-side layers during fabrication.

The front-side stress compensation pattern 210 may be configured to compensate for stress caused by the back-side stress compensation pattern 220, or vice versa. In a particular embodiment, the front-side stress compensation pattern 210 may be a vertical stress compensation pattern to compensate for stress in a vertical direction, a horizontal stress compensation pattern to compensate for stress in a horizontal direction, or a combination thereof. The backside stress compensation pattern 220 may also be a vertical stress compensation pattern to compensate for stress in a vertical direction, a horizontal stress compensation pattern to compensate for stress in a horizontal direction, or a combination thereof.

The front-side stress compensation pattern 210 and the back-side stress compensation pattern 220 may reduce an amount of warpage for two-dimensional and three-dimensional passive wafers. For example, the stress compensation patterns 210, 220 may reduce an amount of warpage for three-dimensional passive-on-glass (POG) wafers.

Figure 3:
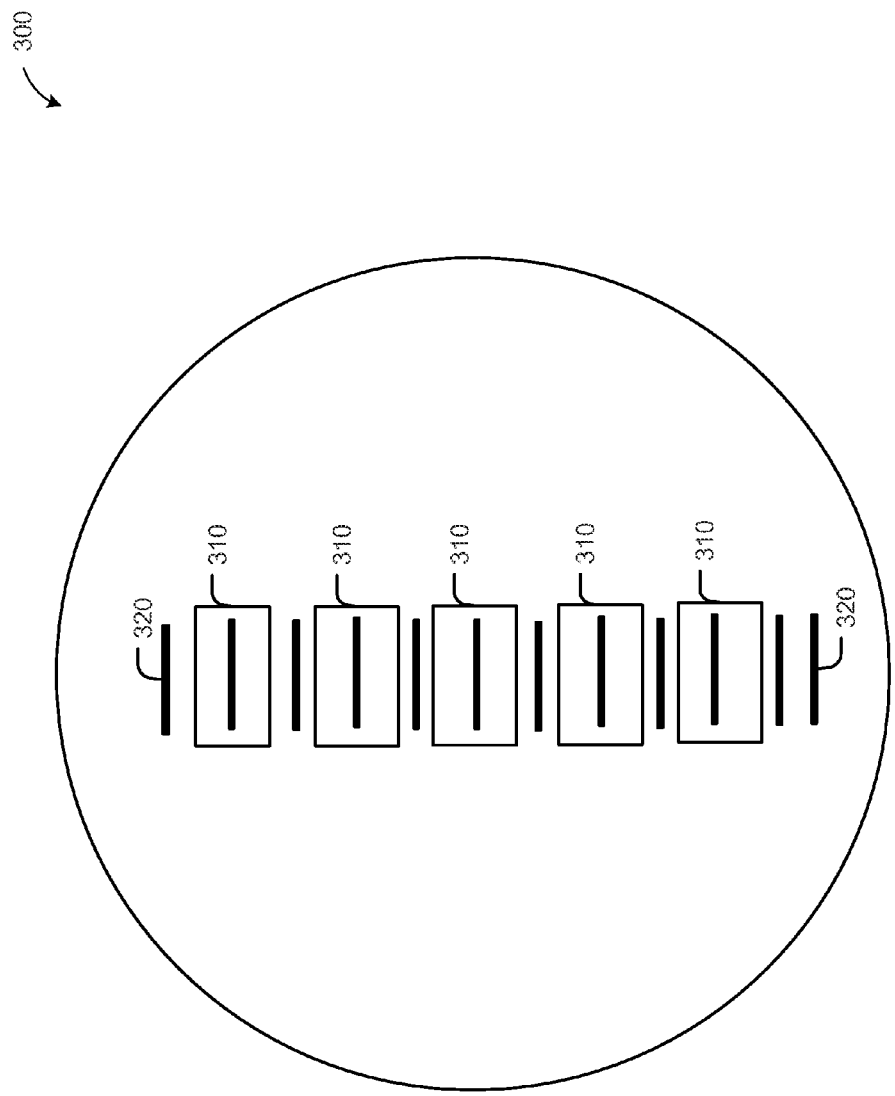
FIG. 3 is a diagram of a particular illustrative embodiment of a front-side mask and a back-side stress compensation pattern.

Referring to FIG. 3, a particular illustrative embodiment 300 of a front-side mask and a back-side stress compensation pattern is shown. A front-side mask 310 is illustrated as clear rectangles and a back-side stress compensation pattern 320 is illustrated as solid lines. In a particular embodiment, the back-side stress compensation pattern 320 may correspond to the stress compensation pattern 190 in the back-side layer 122 of FIG. 1.

The front-side mask 310 may be used to configure a layout for particular elements and/or layers that are to be deposited on the front-side of an integrated passive device. For example, the front-side mask 310 may configure the layout for depositing the metallization layers 112, 114, 118, 120 of FIG. 1. In addition, the front-side mask 310 may be used to deposit metal in one or more front-side layers according to a stress-compensation pattern to compensate for stress and warpage that may result from depositing the metallization layers 112, 114, 118, 120. The back-side stress compensation pattern 320 may be dependent on the front-side mask 310 to reduce stress (and warpage) caused by particular element and/or layers associated with the front-side mask 310. For example, fabrication equipment may selectively form the back-side stress compensation pattern 320 into one or more back-side layers of an integrated passive device by depositing metal into the one or more back-side layers to compensate for warpage that may be caused by mask features (e.g., features that result in metallization layers, CMOS circuitry, etc.) at the front-side of the integrated passive device.

Figure 4:
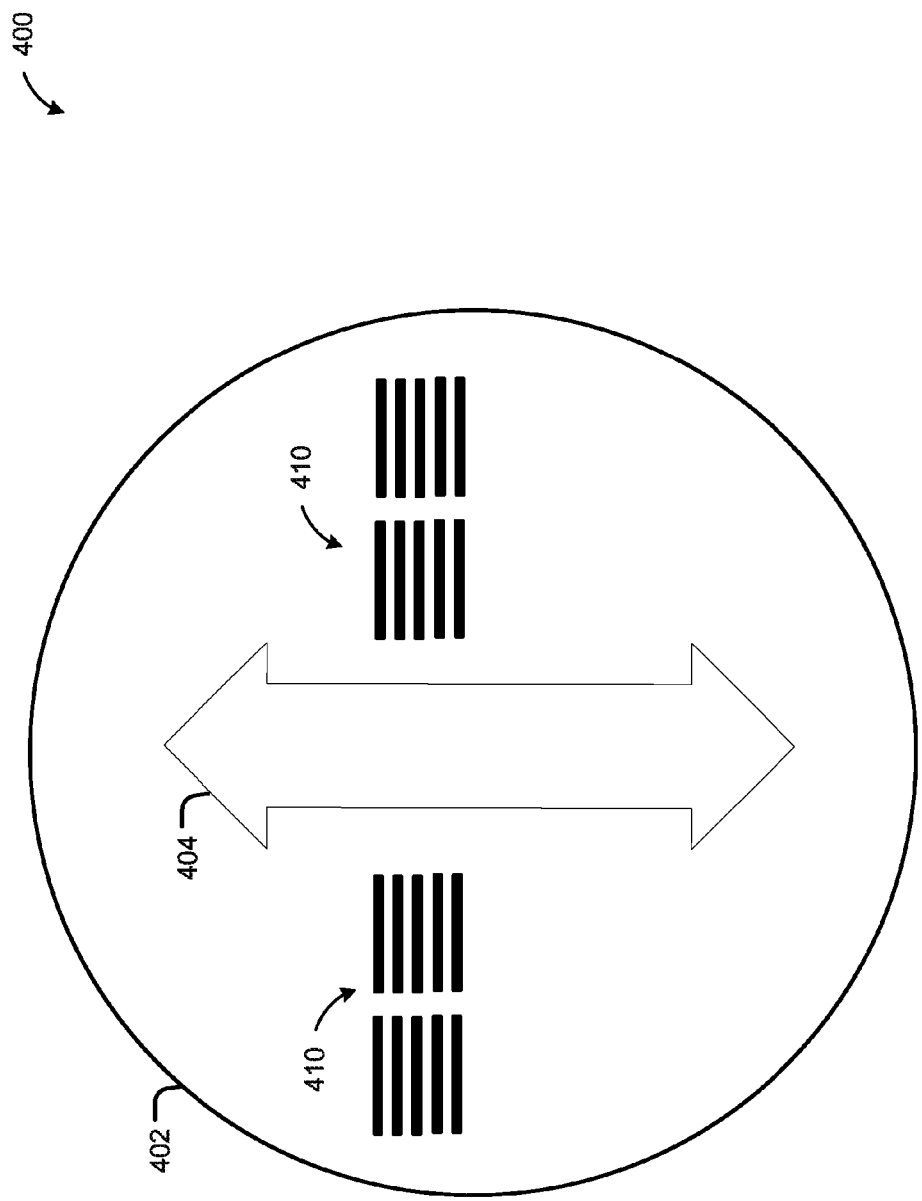
FIG. 4 is a diagram of a particular illustrative embodiment of scribing lines that may be implemented after wafer fabrication to reduce wafer-stress.

Referring to FIG. 4, a particular illustrative embodiment 400 illustrating scribing lines implemented after wafer fabrication to reduce wafer-stress is shown.

After fabrication, a wafer 402 may include stress that causes the wafer 402 to warp in a particular direction. For example, the stress may cause the wafer 402 to warp in the direction of the arrow 404 after the wafer 402 has been fabricated. The stress may be a result of one or more metal features (e.g., one or more of the metallization layers 112, 114, 118, 120 of FIG. 1). Scribing lines 410 (e.g., holes) may be scribed into the wafer 402 after wafer fabrication to compensate for the stress. For example, a machine (e.g. a processor) may execute instructions to analyze a physical structure of the wafer 402 after fabrication of the wafer 402 to identify stressed areas of the wafer 402. In addition, the instructions may be executable by the processor to analyze the physical structure of the wafer 402 to identify a particular direction of the stress or warpage.

In response to analyzing the physical structure of the wafer 402, a laser scribing tool may selectively scribe holes in select layers of the wafer 402 to relieve the stress. For example, in the illustrative embodiment, the laser scribing tool may scribe holes in non-active areas of the wafer 402 to relieve the directional stress according to a stress compensation pattern.

The scribing lines 410 may be scribed into at least one layer of a device to reduce an amount of warpage of the device. For example, the scribing lines 410 may be scribed into an inter-layer dielectric (ILD) of the wafer 402. For example, the wafer 402 may correspond to the wafer 195 of FIG. 1 and the scribing lines 410 may be scribed into the ILD 116. Thus, the scribing lines may correspond to the stress compensation pattern 170 of the ILD 116. The scribing lines 410 may also be scribed in a back-side layer. For example, the scribing lines 410 may correspond to the stress compensation pattern 190 of the back-side layer 122. Using a laser scribing tool to selectively scribe scribing lines 410 into the wafer 402 may permit stress relief and warpage reduction after the wafer 402 has been fabricated.

Figure 5:
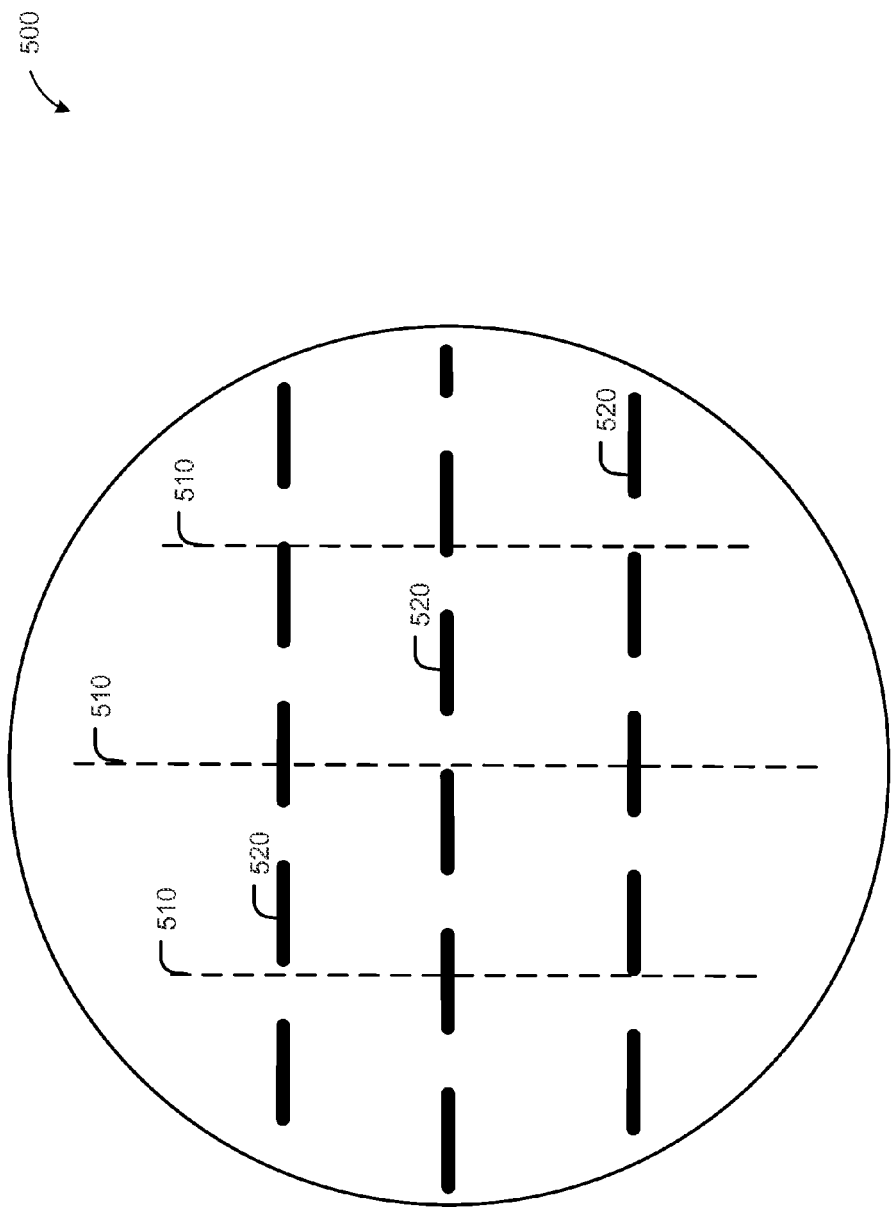
FIG. 5 is a diagram of a particular illustrative embodiment of a layout for implementing scribing lines using dicing streets after wafer fabrication.

Referring to FIG. 5, a particular illustrative embodiment of a layout 500 for implementing scribing lines using dicing streets after wafer fabrication is shown.

The layout 500 illustrates vertical dicing streets 510 and horizontal dicing streets 520. Scribing lines, such as the scribing lines 410 of FIG. 4, may be scribed into a wafer (e.g., the wafer 195) using the dicing streets 510, 520. For example, the dicing streets 510, 520 may be placed between dies based on an area (e.g., non-active area) where scribing lines may be scribed without affecting circuitry in the wafer. For example, the dicing streets 510, 520 may correspond to areas where there is no circuitry in the wafer. In a particular embodiment, the vertical dicing streets 510 may have different characteristics than the horizontal dicing streets 520. For example, the vertical dicing streets 510 may be narrower and shorter while the horizontal dicing streets 520 may be wider and longer. Widths, lengths, and/or inter-street spacing of the dicing streets 510, 520 may be adjusted to compensate for stress release.

Figure 6:
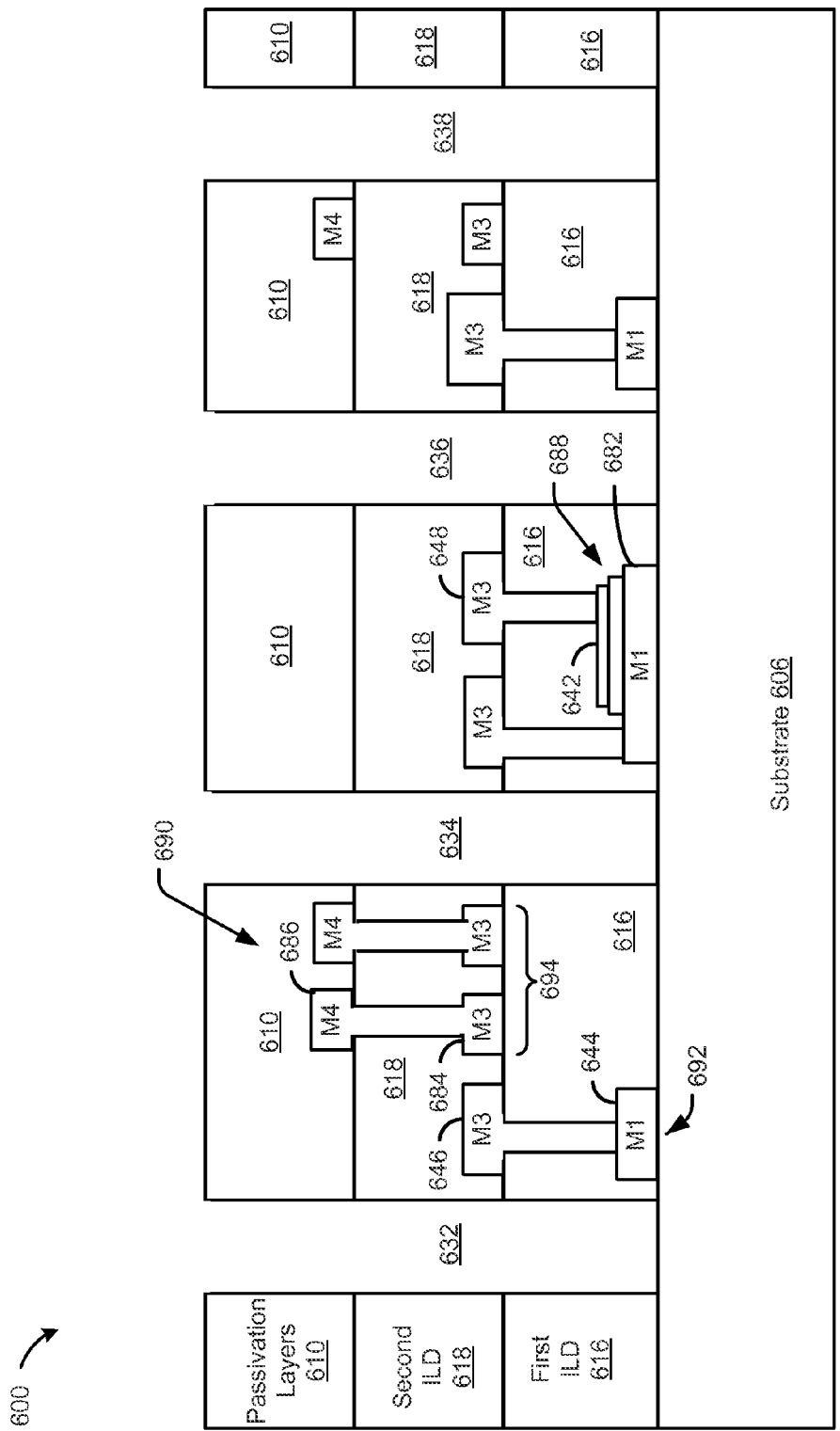
FIG. 6 is a diagram of a particular illustrative embodiment of a device that includes a single-sided stress compensation pattern to reduce stress.

Referring to FIG. 6, a particular illustrative embodiment of a device 600 that includes a single-sided stress compensation pattern is shown. FIG. 6 shows a cross sectional view of the device 600. The device 600 may include one or more voids in at least one layer of the device 600 to reduce an amount of warpage of the device 600.

The device 600 includes a substrate 606. The substrate 606 may be made of a low-loss material (e.g., dielectric, wide-bandgap semiconductor, etc.). The low-loss material may include a dielectric material or a highly-insulative semiconductor material. In a particular embodiment, the device 600 is an integrated passive device and the substrate 606 is a glass-type substrate. In another particular embodiment, the substrate 606 is a silicon-type substrate. In yet another particular embodiment, the substrate 606 may include a silicon-on-insulator (SOI) substrate, a silicon-on-sapphire (SOS) substrate, a high resistivity substrate (HRS), or a silicon carbide (SiC) substrate, as illustrative, non-limiting examples.

The device 600 also includes a first inter-layer dielectric (ILD) 616. The first ILD 616 may include a first set of metallization layers (M1) and a second metallization layer 642. The first set of metallization layers (M1) and the second metallization layer 642 may each have a thickness of up to ten micrometers. The device 600 also includes a second ILD 618. The second ILD 618 includes a third set of metallization layers (M3). In a particular embodiment, metallization layers in the third set of metallization layers (M3) may be coupled to metallization layers in the first set of metallization layers (M1). For example, a metallization layer 644 in the first set of metallization layers (M1) may be coupled to a metallization layer 646 in the third set of metallization layers (M3). In a particular embodiment, the second metallization layer 642 may be coupled to at least one metallization layer 648 in the third set of metallization layers (M3).

The device 600 also includes a passivation surface 610 (e.g., passivation layer). The passivation surface 610 may include one or more metal features, such as a fourth set of metallization layers (M4). In a particular embodiment, inputs and outputs (I/Os) of the device 600 may be formed in the fourth set of metallization layers (M4). The fourth set of metallization layers (M4) may have a thickness of up to ten micrometers.

The device 600 may also include stress compensation patterns to reduce stress and warpage caused by each set of the metallization layers (M1, M3, M4), the second metallization layer 642, or a combination thereof. For example, the device 600 may include a first via 632, a second via 634, a third via 636, and a fourth via 638. The vias 632-638 may correspond to trenches that are formed in the device 600 after the layers 606, 610, 616, 618 in the device 600 have been formed. For example, the vias 632-638 may be etched through the layers 610, 616, 618 to compensate for stress and warpage caused by the metallization layers (M1, M3, M4). In a particular embodiment, the vias 632-638 may be formed (e.g., etched) into the substrate 606.

In a particular embodiment, the vias 632-638 may be inter-die (e.g., inter-device) position-dependent patterns that are a function of a distance of the device 600 from a center of a wafer, a function of an angle associated with the position of the device 600 on the wafer, or a combination thereof. In addition, or alternatively, the vias 632-638 may be intra-die position dependent patterns.

In a particular embodiment, the device 600 may include one or more additional inter-layer dielectrics, one or more additional metallization layers, or a combination thereof. For example, the device 600 may include a third ILD (not shown) that includes a fifth set of metallization layers (M5).

The thickness of each set of metallization layers (M1, M3, M4, M5) may vary based on design implementation. For example, in a particular embodiment, the thickness of the first set of metallization layers (M1) may be approximately 3 micrometers, and the thickness of the second metallization layer 642 may be approximately 1 micrometer. The first set of metallization layers (M1) and the second metallization layer 642 may be comprised of aluminum (Al). In a particular embodiment, the second metallization layer 642 may correspond to a top electrode of a capacitor and a particular metallization layer 682 of the first set of metallization layers (M1) may correspond to a bottom electrode of the capacitor to form a capacitor structure 688 (e.g. a metal-insulator-metal (MIM) capacitor with the top and bottom electrodes separated by a dielectric material).

In a particular embodiment, M1 and M2 may have a line spacing of approximately 8 micrometers and a line width of approximately 8 micrometers. In a particular embodiment, the thickness of the third set of metallization layers (M3) may be approximately 15 micrometers and the thickness of the fourth set of metallization layers (M4) may be approximately 15 micrometers. The third set of metallization layers (M3) and the fourth set of metallization layers (M4) may be comprised of copper (Cu) and may each have a line spacing of approximately 20 micrometers and a line width of approximately 20 micrometers.

In a particular embodiment, particular metallization layers may form one or more inductive structures. For example, the metallization layer 644 in the first set of metallization layers (M1) and the metallization layer 646 in the third set of metallization layers (M3) may correspond to an "underpass" 692 (e.g. an input connection) of an inductor 690, and components in the M3 and M4 layers may correspond to a spiral coil 694 of the inductor 690. The M1 metallization layer 644 may have a thickness of approximately 3 micrometers, the M3 layer may have a thickness of approximately 15 micrometers, and the M4 layer may have a thickness of approximately 15 micrometers. In one or more other embodiments, the coil 694 may extend into an M5 layer or higher. In yet another embodiment, rather than connecting to the coil 694 via the underpass 692, an "overpass" may include components in the M4 layer and in the M5 layer as a connection to the coil 694. The fifth set of metallization layers (M5) may include a thickness of approximately 8 micrometers (mm), a line width of approximately 20 micrometers, and a line spacing of approximately 20 micrometers.

In a particular embodiment, the device 600 may include one or more passive structures, one or more active structures, or a combination thereof. For example, the metallization layers (M1, M2, M3, M4, M5) may form one or more resistors, capacitors, transistors, inductors, etc. Additionally, in a particular embodiment, the thickness of at least one metallization layer may be greater than 15 micrometers. In a particular embodiment, the thickness of at least one metallization layer may be less than 15 micrometers. In a particular embodiment, the thickness of at least one metallization layer may be approximately equal to 15 micrometers. For example, the thickness of a particular metallization layer may be approximately 10 micrometers, 15 micrometers, 20 micrometers, 25 micrometers, 30 micrometers, etc. The line spacing and the line width for each metallization layer and each ILD may also vary based on design implementation.

Figure 7:
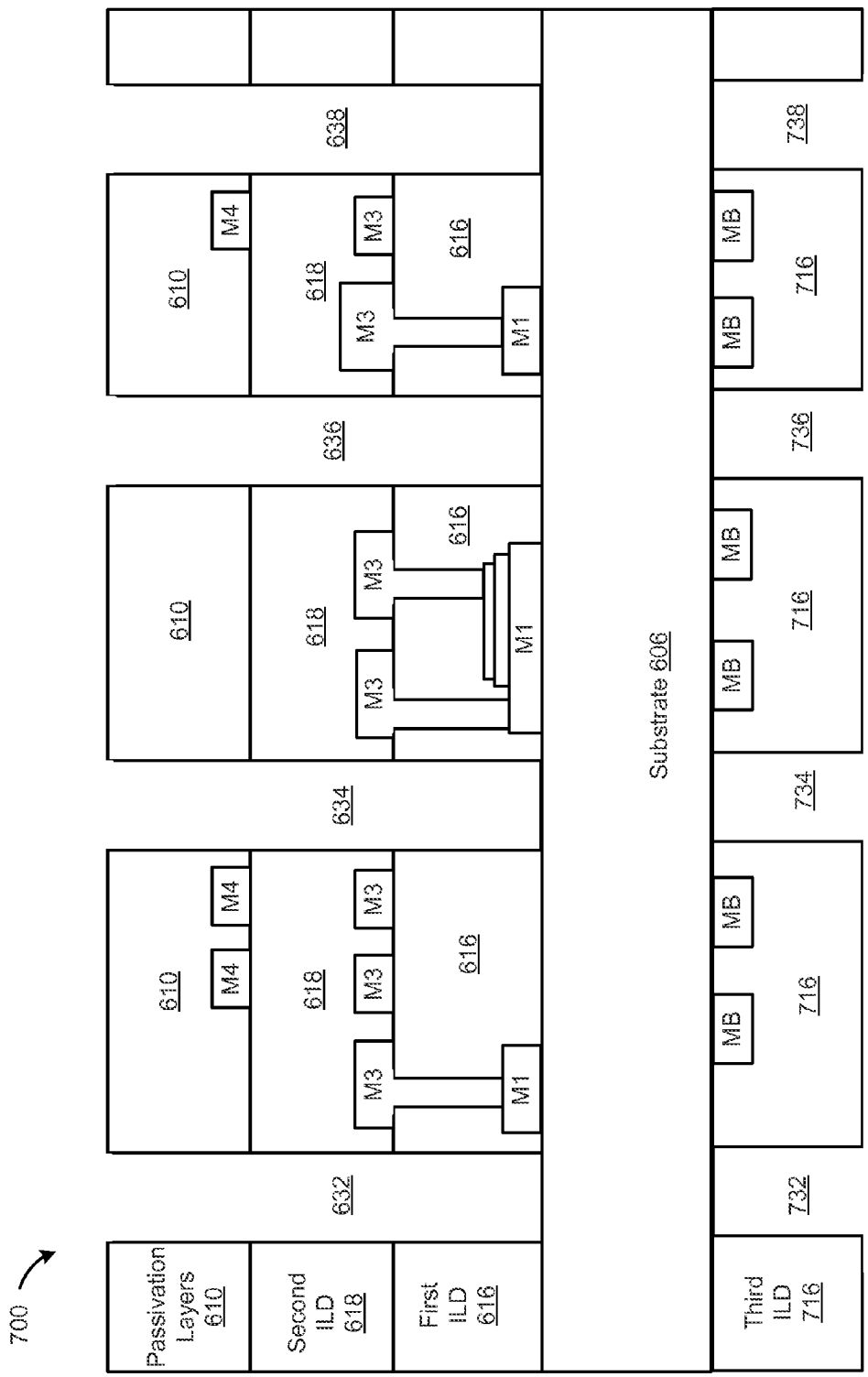
FIG. 7 is a diagram of a particular illustrative embodiment of a device that includes a double-sided stress compensation pattern to reduce stress.

Referring to FIG. 7, a particular illustrative embodiment of a device 700 that includes a double-sided stress compensation pattern is shown. FIG. 7 shows a cross sectional view of the device 700.

The device 700 includes the substrate 606, the first ILD 616, the second ILD 618, and the passivation surface 610. The device 700 may also include the vias 632-638 (e.g. stress compensation patterns) to compensate for stress and warpage caused by the metallization layers (M1, M3, M4), as described with respect to FIG. 6. The first ILD 616, the second ILD 618, and the passivation surface 610 may be located at a front-side of the device 700.

The device 700 may also include a third ILD 716 located at a back-side of the device 700. The third ILD 716 may include a set of back-side metallization layers (MB). Each metallization layer located at the back-side of the device 700 may have a thickness of up to ten micrometers. The device 700 may include a second stress compensation pattern to compensate for stress and warpage caused by the set of back-side metallization layers (MB), each set of metallization layers (M1, M3, M4) located at the front-side of the device 700, or a combination thereof. For example, the device 700 may include a fifth via 732, a sixth via 734, a seventh via 736, and an eighth via 738. The vias 732-738 may correspond to trenches that are formed in the layers 606, 610, 616, 618, 716 after the device 700 has been formed. For example, the vias 732-738 may be etched into the third ILD 716 to compensate for stress and warpage caused by the metallization layers (M1, M3, M4) at the front-side of the device 700, the back-side metallization layers (MB), or any combination thereof. In a particular embodiment, the vias 732-738 may be formed (e.g., etched) into the substrate 606.

In a particular embodiment, the vias 732-738 may be inter-die (e.g., inter-device) position-dependent patterns that are a function of a distance of the device 700 from a center of a wafer, a function of an angle associated with the position of the device 700 on the wafer, or a combination thereof. In addition, or alternatively, the vias 732-738 may be intra-die position dependent patterns.

Although the vias 732-738 located at the back-side of the device 700 are shown to be symmetrical to the vias 632-638 located at the front-side of the device 700, in a particular embodiment, the vias 732-738 located at the back-side of the device 700 may be etched according to a different pattern (e.g., asymmetrical) than the vias 632-638 located at the front-side of the device 700. For example, the vias 632-638 located at the front-side of the device 700 and the vias 732-738 located at the back-side of the device may be etched according to the front-side stress compensation pattern 210 of FIG. 2 and the back-side stress compensation pattern 220 of FIG. 2, respectively.

Figure 8:
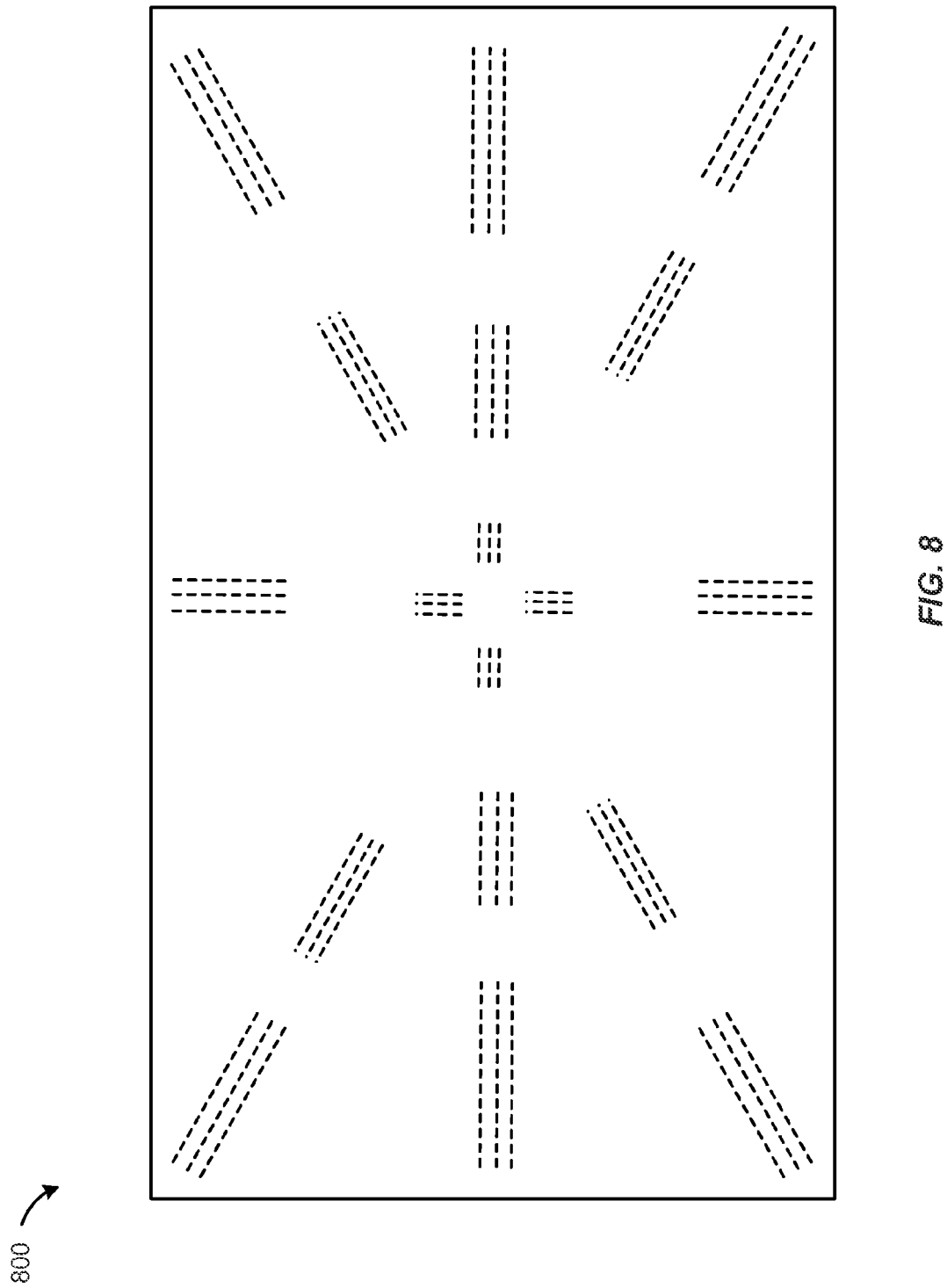
FIG. 8 is a diagram of a particular illustrative embodiment of a compensation pattern implemented within a panel.

Referring to FIG. 8, a particular illustrative embodiment of a compensation pattern implemented within a panel 800 is shown. The panel 800 may include stress compensation patterns (e.g., panel-level stress compensation patterns) that are a function of a distance from the center of the panel 800. The stress compensation pattern may be configured to reduce an amount of warpage associated with the panel. In a particular embodiment, the panel 800 corresponds to a panel for a display device and is larger than the wafer 195 of FIG. 1. The panel-level stress compensation pattern may be formed using a panel-sized mask.

The panel-level stress compensation patterns may provide more stress compensation to areas located closer to the edge of the panel 800 than to areas located closer to the center of the panel 800. As an illustrative example, the length of each particular element (etch, via, scribing line, and/or metallic deposit) in the panel-level stress compensation pattern may be a function of a distance from the center of the panel 800. Areas located near the edge of the panel 800 may include more stress compensation than areas located near the center of the panel 800.

Layers within the panel 800 may include stress compensation patterns that are formed in a similar manner as the stress compensation patterns 160-190 of FIG. 1. In a particular embodiment, the panel 800 may include front-side stress compensation patterns and back-side compensation patterns in a similar manner as described with respect to FIGS. 2-3. In a particular embodiment, the panel-level stress compensation patterns in the panel 800 may also be implemented using dicing streets and scribing lines as described with respect to FIGS. 4-5. In a particular embodiment, the panel-level stress compensation patterns in the panel 800 may include vias that are etched into particular layers of the panel 800 in a similar manner as described with respect to FIGS. 6-7.

Figure 9:
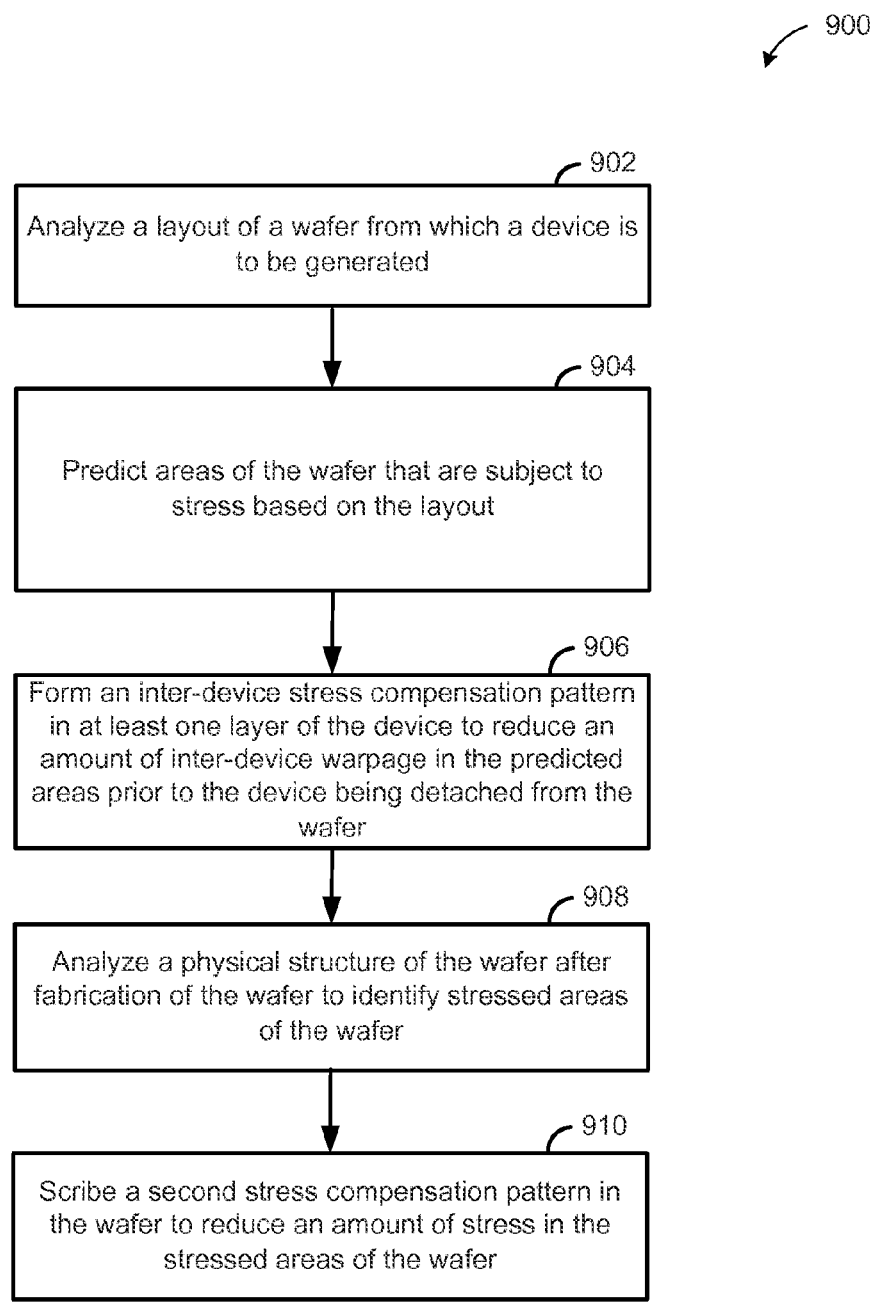
FIG. 9 is a flowchart of a particular illustrative embodiment of a method for reducing an amount of warpage of a device.

Referring to FIG. 9, a particular illustrative embodiment of a method 900 for reducing an amount of warpage of a device is shown. For example, the method 900 may reduce an amount of warpage of a wafer, a panel, a device integrated into the wafer or panel, or any combination thereof.

The method 900 includes analyzing a layout of a wafer (or a panel) from which a device is to be generated, at 902. For example, a machine (e.g., a processor) may execute instructions to analyze a layout of the wafer 195 of FIG. 1 from which the device 100 is to be generated. Areas of the wafer that are subject to stress may be determined and/or predicted based on the layout, at 904. For example, the instructions may further be executable by a machine to predict areas of the wafer 195 of FIG. 1 that are subject to stress based on the layout of the wafer 195. The stress may be caused by a first thermal expansion of the metallization layers 112, 114, 118, 120 that is different than a second thermal expansion of the substrate 106 (e.g., a glass substrate) of the device 100. In a particular embodiment, a processor may execute instructions to analyze a layout of the panel 800 of FIG. 8.

An inter-device stress compensation pattern may be formed in at least one layer of the device to reduce an amount of inter-device warpage in the predicted areas prior to the device being detached from the wafer, at 906. For example, in FIG. 1, at least one of the stress compensation patterns 160-190 may be formed to reduce an amount of inter-device warpage. For example, the stress compensation patterns 160-190 may also be configured to reduce warpage of the wafer 195 from which the device 100 is generated.

A physical structure of the wafer (or panel) may be analyzed after fabrication of the wafer to identify stressed areas of the wafer, at 908. For example, in FIG. 1, a machine (e.g., a processor) may execute instructions to analyze the physical structure of the wafer 195 after the wafer 195 is fabricated to identify stressed areas of the wafer 195. In addition, the instructions may be executable by the processor to analyze the physical structure of the wafer 195 to identify a particular direction of the stress as described with respect to FIG. 4. In a particular embodiment, a processor may execute instructions to analyze the physical structure of the panel 800 of FIG. 8 after the panel 800 is fabricated to identify stressed areas of the panel 800.

A second stress compensation pattern in the wafer may be scribed to reduce an amount of stress in the stressed areas of the wafer, at 910. For example, in response to analyzing the physical structure of the wafer 195, a laser scribing tool may selectively scribe holes (e.g. scribing lines) in one or more layers of the wafer 195 to relieve the stress. For example, in FIG. 4, the laser scribing tool may scribe holes in non-active areas of the wafer to relieve the vertical stress according to a stress compensation pattern. In a particular embodiment, a laser scribing tool may selectively scribe holes (e.g., scribing lines) in one or more layers of the panel 800 of FIG. 8 to relieve stress in response to analyzing the physical structure of the panel 800.

The method 900 may also include forming a stress compensation pattern in at least one layer of a device to reduce an amount of warpage of the device. For example, in FIG. 6, one or more voids may be formed in at least one layer of the device 600. The vias 632-638 (e.g., voids) may correspond to trenches that are formed in the device 600 after the layers 606, 610, 616, 618 in the device 600 have been formed. For example, the vias 632-638 may be etched through the layers 610, 616, 618 to compensate for stress and warpage caused by the metallization layers (M1, M3, M4). As another example, in FIG. 4, a pattern of scribing lines may be scribed into at least one layer of the wafer 402 (and a device from which the wafer 402 is generated). A laser scribing tool may selectively scribe holes in select layers of the wafer 402 to relieve the stress. For example, the laser scribing tool may scribe holes in non-active areas of the wafer 402 to relieve the directional stress according to a stress compensation pattern.

The stress compensation patterns may be preventive measures implemented during fabrication of the wafer 195 by selectively etching or selectively depositing metal on particular layers of the device 100 according to a wafer-level stress compensation pattern. The stress compensation patterns may also, or alternatively, be implemented as post-relief measures after fabrication of the wafer 195 by selectively scribing lines (e.g., holes) into particular layers of the device 100 according to the wafer-level stress compensation pattern. Reducing the amount of stress, and thus reducing an amount of warpage, may improve processing efficiency and improve the testability of the device 100. Reducing the amount of stress may also improve the radio frequency performance of an electronic device that includes the device 100.

The method of FIG. 9 may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 900 of FIG. 9 may be performed by a processor that executes instructions. As another example, the method 900 of FIG. 9 may be performed by fabrication equipment, such as a processor that executes instructions stored at a memory (e.g., a non-transitory computer-readable medium), as described further with reference to FIG. 11.

Figure 10:
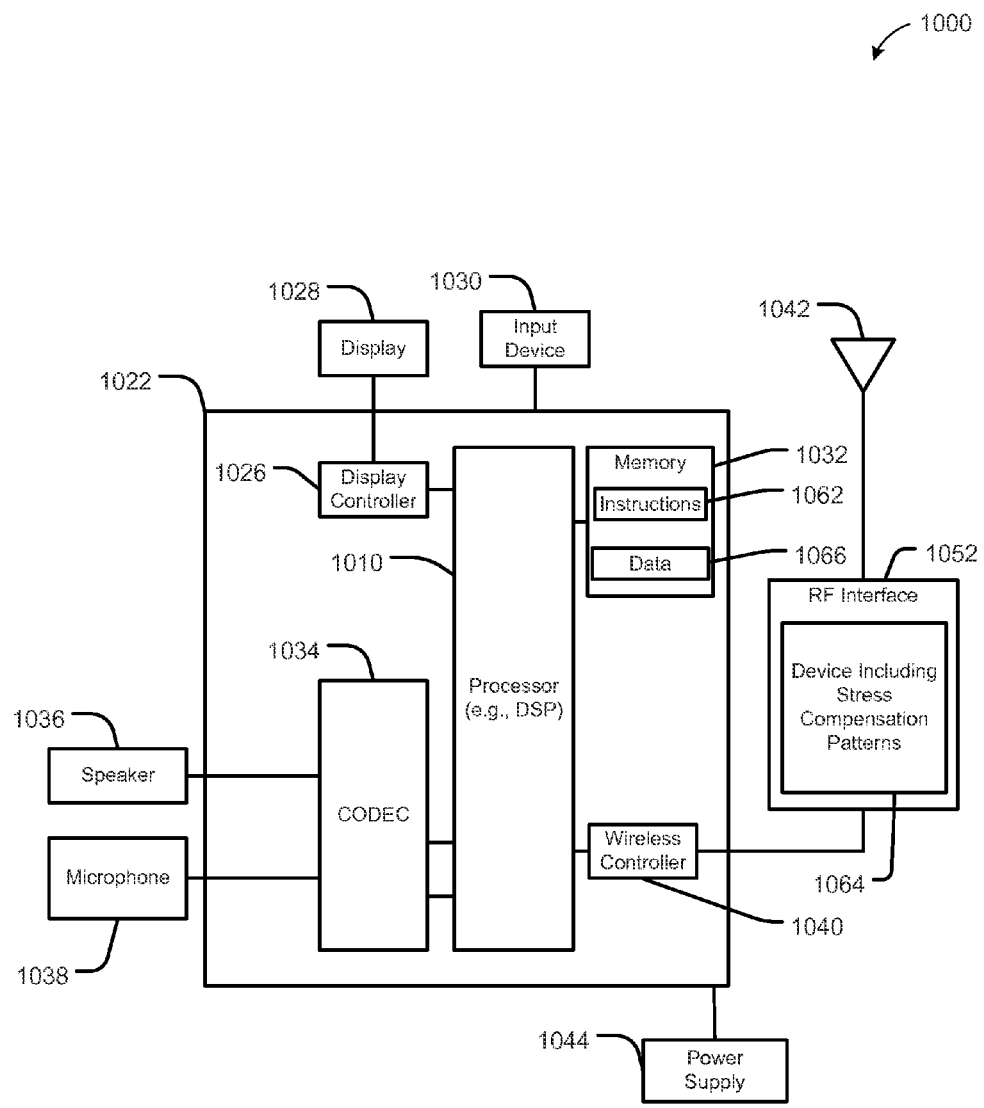
FIG. 10 is a block diagram of a wireless communication device including a device that includes stress compensation patterns to reduce stress.

Referring to FIG. 10, a block diagram of a particular illustrative embodiment of a wireless communication device is depicted and generally designated 1000. The wireless communication device 1000 includes a processor 1010, such as a digital signal processor (DSP), coupled to a memory 1032 (e.g., a random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art). The memory 1032 may include a storage medium that stores instructions 1062 executable by the processor 1010. The memory 1032 may store data 1066 accessible to the processor 1010.

The wireless communication device 1000 includes a device 1064 that includes stress compensation patterns to reduce stress. In an illustrative embodiment, the device 1064 may correspond to the device 100 of FIG. 1, a device having stress compensation patterns according to one or more of FIGS. 2-5, the device 600 of FIG. 6, the device 700 of FIG. 7, the panel 800 of FIG. 8, a device formed according to the method 900 of FIG. 9, or any combination thereof. For example, as depicted in FIG. 10, a radio frequency (RF) interface 1052 may include the device 1064.

FIG. 10 also shows a display controller 1026 that is coupled to the processor 1010 and to a display 1028. A coder/decoder (CODEC) 1034 may also be coupled to the processor 1010. A speaker 1036 and a microphone 1038 may be coupled to the CODEC 1034. FIG. 10 also indicates that a wireless controller 1040 may be coupled to the processor 1010 and may be further coupled to an antenna 1042 via the RF interface 1052.

In a particular embodiment, the processor 1010, the display controller 1026, the memory 1032, the CODEC 1034, and the wireless controller 1040 are included in a system-in-package or system-on-chip device 1022. In a particular embodiment, an input device 1030 and a power supply 1044 are coupled to the system-on-chip device 1022. Moreover, in a particular embodiment, as illustrated in FIG. 10, the display 1028, the input device 1030, the speaker 1036, the microphone 1038, the RF interface 1052, the wireless antenna 1042, and the power supply 1044 are external to the system-on-chip device 1022. However, each of the display 1028, the input device 1030, the speaker 1036, the microphone 1038, the RF interface 1052, the antenna 1042, and the power supply 1044 may be coupled to a component of the system-on-chip device 1022, such as an interface or a controller.

The foregoing disclosed devices and functionalities may be designed and configured into computer files (e.g. RTL, GDSII, GERBER, etc.) stored on computer readable media. Some or all such files may be provided to fabrication handlers who fabricate devices based on such files. Resulting products include wafers that are then cut into die and packaged into a chip. The chips are then integrated into electronic devices, as described further with reference to FIG. 11.

Figure 11:
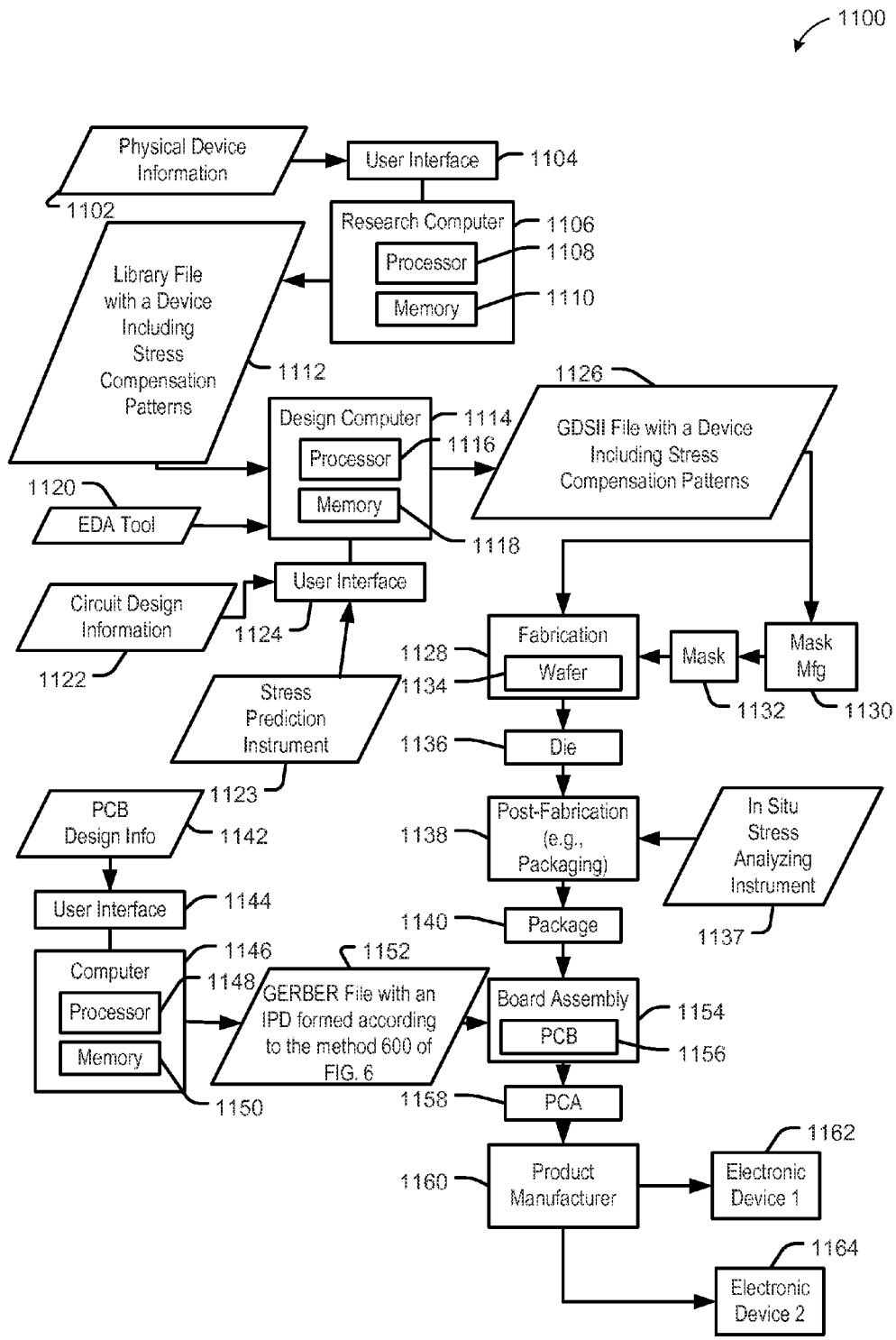
FIG. 11 is a data flow diagram of a particular illustrative embodiment of a manufacturing process to manufacture wafers that include a device that includes stress compensation patterns.

Referring to FIG. 11, a particular illustrative embodiment of an electronic device manufacturing process is depicted and generally designated 1100. In FIG. 11, physical device information 1102 is received at the manufacturing process 1100, such as at a research computer 1106. The physical device information 1102 may include design information representing at least one physical property of a device, such as the device 100 of FIG. 1, the wafer 195 of FIG. 1, a wafer having stress compensation patterns according to one or more of FIGS. 2-5, the device 600 of FIG. 6, the device 700 of FIG. 7, the panel 800 of FIG. 8, a wafer or panel formed according to the method 900 of FIG. 9, or any combination thereof. For example, the physical device information 1102 may include physical parameters, material characteristics, and structure information that is entered via a user interface 1104 coupled to the research computer 1106. The research computer 1106 includes a processor 1108, such as one or more processing cores, coupled to a computer readable medium such as a memory 1110. The memory 1110 may store computer readable instructions that are executable to cause the processor 1108 to transform the physical device information 1102 to comply with a file format and to generate a library file 1112.

In a particular embodiment, the library file 1112 includes at least one data file including the transformed design information. For example, the library file 1112 may include a library of circuits including the device 100 of FIG. 1, the wafer 195 of FIG. 1, a wafer having stress compensation patterns according to one or more of FIGS. 2-5, the device 600 of FIG. 6, the device 700 of FIG. 7, the panel 800 of FIG. 8, a wafer or panel formed according to the method 900 of FIG. 9, or any combination thereof provided for use with an electronic design automation (EDA) tool 1120.

The library file 1112 may be used in conjunction with the EDA tool 1120 at a design computer 1114 including a processor 1116, such as one or more processing cores, coupled to a memory 1118. The EDA tool 1120 may be stored as processor executable instructions at the memory 1118 to enable a user of the design computer 1114 to design a circuit including the device 100 of FIG. 1, the wafer 195 of FIG. 1, a wafer having stress compensation patterns according to one or more of FIGS. 2-5, the device 600 of FIG. 6, the device 700 of FIG. 7, the panel 800 of FIG. 8, a wafer or panel formed according to the method 900 of FIG. 9, or any combination thereof using the library file 1112. For example, a user of the design computer 1114 may enter circuit design information 1122 via a user interface 1124 coupled to the design computer 1114. The circuit design information 1122 may include design information representing at least one physical property of a circuit (e.g., the device 100 of FIG. 1, the wafer 195 of FIG. 1, a wafer having stress compensation patterns according to one or more of FIGS. 2-5, the device 600 of FIG. 6, the device 700 of FIG. 7, the panel 800 of FIG. 8, a wafer or panel formed according to the method 900 of FIG. 9, or any combination thereof). To illustrate, the circuit design property may include identification of particular circuits and relationships to other elements in a circuit design, positioning information, feature size information, interconnection information, or other information representing a physical property of a device.

The design computer 1114 may be configured to transform the design information, including the circuit design information 1122, to comply with a file format. To illustrate, the file formation may include a database binary file format representing planar geometric shapes, text labels, and other information about a circuit layout in a hierarchical format, such as a Graphic Data System (GDSII) file format. The design computer 1114 may be configured to generate a data file including the transformed design information, such as a GDSII file 1126 that includes information describing the device 100 of FIG. 1, the wafer 195 of FIG. 1, a wafer having stress compensation patterns according to one or more of FIGS. 2-5, the device 600 of FIG. 6, the device 700 of FIG. 7, the panel 800 of FIG. 8, a wafer or panel formed according to the method 900 of FIG. 9, or any combination thereof in addition to other circuits or information. To illustrate, the data file may include information corresponding to a system-on-chip (SOC) that includes the device 100 of FIG. 1, the wafer 195 of FIG. 1, a wafer having stress compensation patterns according to one or more of FIGS. 2-5, the device 600 of FIG. 6, the device 700 of FIG. 7, the panel 800 of FIG. 8, a wafer or panel formed according to the method 900 of FIG. 9, or any combination thereof, and that also includes additional electronic circuits and components within the SOC.

The GDSII file 1126 may be received at a fabrication process 1128 to manufacture the device 100 of FIG. 1, the wafer 195 of FIG. 1, a wafer having stress compensation patterns according to one or more of FIGS. 2-5, the device 600 of FIG. 6, the device 700 of FIG. 7, the panel 800 of FIG. 8, a wafer or panel formed according to the method 900 of FIG. 9, or any combination thereof, according to transformed information in the GDSII file 1126. For example, a device manufacture process may include providing the GDSII file 1126 to a mask manufacturer 1130 to create one or more masks, such as masks to be used with photolithography processing, illustrated as a representative mask 1132. For example, the mask 1132 may correspond to the mask 199 of FIG. 1. The mask 1132 may be used during the fabrication process to generate one or more wafers 1134 (or panels), such as the wafer 195 of FIG. 1, a wafer having stress compensation patterns according to one or more of FIGS. 2-5, the panel 800 of FIG. 8, a wafer formed according to the method 900 of FIG. 9, or any combination thereof, which may be tested and separated into dies, such as a representative die 1136.

In conjunction with the described embodiments, one or more non-transitory computer-readable mediums or storage devices may store instructions executable by one or more computers to perform the method 900 of FIG. 9. For example, a non-transitory computer-readable medium may store instructions executable by the computer to analyze a layout of a wafer from which an integrated passive device (e.g., the device 100 of FIG. 1, the device 600 of FIG. 6, the device 700 of FIG. 7, or any combination thereof) is generated. The non-transitory computer-readable medium may store instructions executable by the computer to predict areas of the wafer that are subject to stress based on the layout. For example, a stress prediction instrument 1123 may analyze the layout of the wafer and determine and/or predict areas of the wafer that are subject to stress. For example, equipment of a manufacturing plant may include the computer and the memory and may perform the method 900 of FIG. 9, such as in connection with the fabrication process 1128 and using the GSDII file 1126. To illustrate, the computer may execute instructions to initiate forming the stress compensation pattern, as described with reference to FIG. 9.

The die 1136 may be provided to a post-fabrication process 1138 (e.g., packaging) where the die 1136 is incorporated into a representative package 1140. A non-transitory computer-readable medium may also store instructions to analyze a physical structure of the wafer after fabrication of the wafer to identify stressed areas of the wafer. For example, an in situ stress analyzing instrument 1137 may analyze the physical structure of the wafer after fabrication of the wafer to identify stressed areas of the wafer. One or more of the stress compensation patterns 160-190 of FIG. 1 may be added during the post-fabrication packaging process 1138 to reduce an amount of stress in the predicted areas. For example, the package 1140 may include the single die 1136 or multiple dies, such as a system-in-package (SiP) arrangement. The package 1140 may be configured to conform to one or more standards or specifications, such as Joint Electron Device Engineering Council (JEDEC) standards. The post-fabrication process 1138 may include laser-scribing the wafer using a laser scribing tool based on the analyzed structure of the wafer, as described with respect to FIGS. 4-5.

Information regarding the package 1140 may be distributed to various product designers, such as via a component library stored at a computer 1146. The computer 1146 may include a processor 1148, such as one or more processing cores, coupled to a memory 1150. A printed circuit board (PCB) tool may be stored as processor executable instructions at the memory 1150 to process PCB design information 1142 received from a user of the computer 1146 via a user interface 1144. The PCB design information 1142 may include physical positioning information of a packaged device on a circuit board, the packaged device corresponding to the package 1140 including the device 100 of FIG. 1, the wafer 195 of FIG. 1, a wafer having stress compensation patterns according to one or more of FIGS. 2-5, the device 600 of FIG. 6, the device 700 of FIG. 7, the panel 800 of FIG. 8, a wafer or panel formed according to the method 900 of FIG. 9, or any combination thereof.

The computer 1146 may be configured to transform the PCB design information 1142 to generate a data file, such as a GERBER file 1152 with data that includes physical positioning information of a packaged device on a circuit board, as well as layout of electrical connections such as traces and vias, where the packaged device corresponds to the package 1140 including the device 100 of FIG. 1, the wafer 195 of FIG. 1, a wafer having stress compensation patterns according to one or more of FIGS. 2-5, the device 600 of FIG. 6, the device 700 of FIG. 7, the panel 800 of FIG. 8, a wafer or panel formed according to the method 900 of FIG. 9, or any combination thereof. In other embodiments, the data file generated by the transformed PCB design information may have a format other than a GERBER format.

The GERBER file 1152 may be received at a board assembly process 1154 and used to create PCBs, such as a representative PCB 1156, manufactured in accordance with the design information stored within the GERBER file 1152. For example, the GERBER file 1152 may be uploaded to one or more machines to perform various steps of a PCB production process. The PCB 1156 may be populated with electronic components including the package 1140 to form a representative printed circuit assembly (PCA) 1158.

The PCA 1158 may be received at a product manufacture process 1160 and integrated into one or more electronic devices, such as a first representative electronic device 1162 and a second representative electronic device 1164. As an illustrative, non-limiting example, the first representative electronic device 1162, the second representative electronic device 1164, or both, may be selected from the group of a cellular phone, a wireless local area network (LAN) device, a set top box, a music player, a video player, an entertainment unit, a navigation device, a communications device, a personal digital assistant (PDA), a fixed location data unit, and a computer, into which the device 100 of FIG. 1, the wafer 195 of FIG. 1, a wafer having stress compensation patterns according to one or more of FIGS. 2-5, the device 600 of FIG. 6, the device 700 of FIG. 7, the panel 800 of FIG. 8, a wafer or panel formed according to the method 900 of FIG. 9, or any combination thereof is integrated. As another illustrative, non-limiting example, one or more of the electronic devices 1162 and 1164 may be remote units such as mobile phones, hand-held personal communication systems (PCS) units, portable data units such as personal data assistants, global positioning system (GPS) enabled devices, navigation devices, fixed location data units such as meter reading equipment, or any other device that stores or retrieves data or computer instructions, or any combination thereof. Although FIG. 11 illustrates remote units according to teachings of the disclosure, the disclosure is not limited to these illustrated units. Embodiments of the disclosure may be suitably employed in any device such as a passive integrated device or a device that includes active integrated circuitry including memory and on-chip circuitry.

A device (e.g., the 100 of FIG. 1, the wafer 195 of FIG. 1, a wafer having stress compensation patterns according to one or more of FIGS. 2-5, the device 600 of FIG. 6, the device 700 of FIG. 7, the panel 800 of FIG. 8, a wafer or panel formed according to the method 900 of FIG. 9, or any combination thereof) may be fabricated, processed, and incorporated into an electronic device, as described in the illustrative process 1100. One or more aspects of the embodiments disclosed with respect to FIGS. 1-10 may be included at various processing stages, such as within the library file 1112, the GDSII file 1126, and the GERBER file 1152, as well as stored at the memory 1110 of the research computer 1106, the memory 1118 of the design computer 1114, the memory 1150 of the computer 1146, the memory of one or more other computers or processors (not shown) used at the various stages, such as at the board assembly process 1154, the stress prediction instrument 1123, the in situ stress analyzing instrument 1137, and also incorporated into one or more other physical embodiments such as the mask 1132, the die 1136, the package 1140, the PCA 1158, other products such as prototype circuits or devices (not shown), or any combination thereof. Although various representative stages are depicted with reference to FIGS. 1-10, in other embodiments fewer stages may be used or additional stages may be included. Similarly, the process 1100 of FIG. 11 may be performed by a single entity or by one or more entities performing various stages of the process 1100.

In conjunction with the described embodiments, an apparatus is disclosed that includes means for relieving stress in at least one layer of a device according to an inter-device pattern to reduce an amount of warpage of the device. For example, the means for relieving stress may include metal features, an etched region, and/or a scribing lines according to an inter-die stress compensation pattern, determined and/or formed by a field-programmable gate array (FPGA) device, an application-specific integrated circuit (ASIC), a processing unit such as a central processing unit (CPU), a digital signal processor (DSP), a controller, another hardware device, firmware device, fabrication equipment, a laser scribing tool, the stress prescription instrument 1123, the in situ stress analyzing instrument 1137, or any combination thereof.

The apparatus also includes means for relieving stress in the device according to an intra-device pattern. For example, the means for relieving stress may include metal features, an etched region, and/or a scribing lines according to an intra-die stress compensation pattern, determined and/or formed by a field-programmable gate array (FPGA) device, an application-specific integrated circuit (ASIC), a processing unit such as a central processing unit (CPU), a digital signal processor (DSP), a controller, another hardware device, firmware device, fabrication equipment, a laser scribing tool, the stress prescription instrument 1123, the in situ stress analyzing instrument 1137, or any combination thereof.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. An apparatus comprising:
a device comprising a first layer located at a first side of a substrate and a second layer located at a second side of the substrate, wherein the first layer includes an inter-device stress compensation pattern configured to reduce an amount of device warpage prior to the device being detached from another device, and wherein the second layer includes a second stress compensation pattern that is different than the inter-device stress compensation pattern.

2. The apparatus of claim 1, wherein the device is an integrated passive device.

3. The apparatus of claim 1, further comprising a metallization layer, wherein the inter-device stress compensation pattern is further configured to reduce warpage caused by a thickness of the metallization layer.

4. The apparatus of claim 3, wherein the thickness of the metallization layer is approximately fifteen micrometers.

5. The apparatus of claim 1, wherein the inter-device stress compensation pattern is further configured to reduce warpage of a wafer from which the device is generated.

6. The apparatus of claim 5, wherein the wafer includes at least two dies having different stress compensation patterns.

7. The apparatus of claim 6, wherein a first die of the at least two dies includes a first intra-device stress compensation pattern, and wherein a second die of the at least two dies includes the inter-device stress compensation pattern and a second intra-device stress compensation pattern.

8. The apparatus of claim 1, wherein the inter-device stress compensation pattern corresponds to at least a portion of a wafer-level pattern.

9. The apparatus of claim 8, wherein the wafer-level pattern comprises a position-dependent pattern that includes pattern elements having different dimensions, wherein the different dimensions are a function of at least a distance from a center of a wafer.

10. The apparatus of claim 9, wherein dies located near an edge of the wafer include more stress compensation than dies located near the center of the wafer.

11. The apparatus of claim 1, wherein the inter-device stress compensation pattern includes a pattern of vias in at least one layer.

12. The apparatus of claim 1, wherein the inter-device stress compensation pattern includes a pattern of metal deposited in at least one layer.

13. The apparatus of claim 1, wherein the substrate includes a semiconductor substrate.

14. The apparatus of claim 1, wherein the substrate includes a glass substrate.

15. The apparatus of claim 1, wherein the second side corresponds to a back-side of the device.

16. The apparatus of claim 1, wherein the first side corresponds to a front-side of the device.

17. The apparatus of claim 1, wherein one of the inter-device stress compensation pattern or the second stress compensation pattern includes pattern elements oriented in a first direction, and wherein a different one of the inter-device stress compensation pattern or the second stress compensation pattern includes pattern elements oriented in a second direction orthogonal to the first direction.

18. The apparatus of claim 17, wherein the first direction corresponds to a direction from the first layer to the second layer, and wherein the second direction corresponds to a direction along the first layer.

19. The apparatus of claim 1, wherein one of the inter-device stress compensation pattern or the second stress compensation pattern is configured to compensate for stress caused by the other of the inter-device stress compensation pattern or the second stress compensation pattern.

20. The apparatus of claim 1, wherein the first layer includes an inter-layer dielectric.

21. The apparatus of claim 1, wherein the inter-device stress compensation pattern includes a pattern of scribing lines.

22. The apparatus of claim 1, wherein the inter-device stress compensation pattern includes a pattern of holes.

23. The apparatus of claim 1, further comprising a second device selected from a set top box, a music player, a video player, an entertainment unit, a navigation device, a communications device, a personal digital assistant (PDA), a fixed location data unit, or a computer, into which the device is integrated.

24. An apparatus comprising:
    means for relieving stress in a device according to an inter-device stress compensation pattern in a first layer located at a first side of a substrate to reduce an amount of warpage of the device; and
    means for relieving stress in the device according to a second stress compensation pattern in a second layer located at a second side of the substrate, wherein the second stress compensation pattern is different than the inter-device stress compensation pattern.

25. The apparatus of claim 24, further comprising a second device selected from a set top box, a music player, a video player, an entertainment unit, a navigation device, a communications device, a personal digital assistant (PDA), a fixed location data unit, or a computer, into which the means for relieving stress in at least one layer of the device and the means for relieving stress in the device according to the second stress compensation pattern are integrated.

26. An apparatus comprising:
    a device comprising a first layer located at a first side of a substrate, wherein the first layer includes a first stress compensation pattern configured to reduce an amount of warpage of the device, wherein the first stress compensation pattern includes one or more voids in the first layer, wherein the device includes a second layer located at a second side of the substrate, the second layer including a second stress compensation pattern, wherein the second stress compensation pattern is different than the first stress compensation pattern.

27. The apparatus of claim 26, wherein the one or more voids include one or more vias.

28. The apparatus of claim 26, wherein the one or more voids include one or more trenches.

29. An apparatus comprising:
    a device comprising a first layer located at a first side of a substrate, wherein the first layer includes a first stress compensation pattern configured to reduce an amount of warpage of the device, wherein the first stress compensation pattern includes a pattern of scribing lines, and wherein the device includes a second layer located at a second side of the substrate, the second layer including a second stress compensation pattern that is different than the first stress compensation pattern.

30. The apparatus of claim 29, wherein the pattern of scribing lines includes a pattern of holes that are scribed into at least one layer.

31. The apparatus of claim 29, wherein the pattern of scribing lines is scribed using a laser scribing tool.

* * * * *